Oct. 8, 1968  W. E. RAPP  3,404,564
SPRING DEFLECTION TESTER

Filed June 1, 1966  2 Sheets-Sheet 1

INVENTOR.
W. E. RAPP
BY R. P. Miller
ATTORNEY

United States Patent Office 3,404,564
Patented Oct. 8, 1968

3,404,564
SPRING DEFLECTION TESTER
Willard E. Rapp, New Brunswick, N.J., assignor to Western Electric Company, Incorporated, New York, N.Y., a corporation of New York
Filed June 1, 1966, Ser. No. 554,403
7 Claims. (Cl. 73—161)

ABSTRACT OF THE DISCLOSURE

A spring deflection tester, which automatically compensates for dimensional differences in contact springs to be tested, includes a device for lifting a weight to reset a gage to an initial position after which a spring is moved into a test position under a probe. As the spring is inserted under the probe, the probe is moved slidably within the weight to compensate for dimensional differences in successively tested springs. Then the weight is released and coupled to the probe, which is in contact with the spring to be tested, to apply a force through the probe against the spring and record the deflection on the gage.

---

This invention relates to a spring deflection tester and more particularly to a device for measuring the deflection characteristics of contact springs in response to an applied force wherein the device automatically compensates for dimensional variations in successive springs placed in the device for testing.

In the testing of small contact type springs, an individual spring is subjected to a predetermined force and the resulting deflection is measured, usually by means of a standard dial indicator gage. Following each test, the gage must be reset to a zero position to compensate for variations in the physical dimensions of successively tested springs. This involves much wasted time and may require the use of a more highly skilled worker. There is a need for a device in which the spring constant of an article such as, for example, a contact spring, may be determined expeditiously with a rapid spring feed-in, feed-out and a rapid resetting of a gage to a start position with automatic compensation for dimensional variations.

An object of the invention resides in a new and improved spring deflection tester.

Another object of this invention is to provide a new and improved device for successively measuring the deflection of a succession of resilient articles in response to a constant force which automatically compensates for dimensional variations in the articles.

It is also an object of this invention to provide a new and improved device for determining the spring constant of a succession of resilient articles wherein the device is reset to an initial indicating position prior to each test and automatically compensates for dimensional differences in the articles as each article is inserted into the device for testing.

It is a further object of this invention to provide a new and improved spring testing apparatus in which a weight is raised to reset a dial indicator gage to an initial position and to then unlock a sensing probe which is positioned to compensate for a variation in the physical dimension of successively tested springs together with a coupling that is actuated upon release of the weight to lock the weight and probe together to deflect the spring and record the deflection on the gage.

With these and other objects in mind, the present invention contemplates a device for raising a weight to reset an indicator gage to a constant initial zero position after which an article to be tested is inserted under a probe to slidably move the probe within the weight to compensate for dimensional differences between successively tested articles whereupon the weight is released and is coupled to the probe to move against the article and record the deflection on the gage.

More particularly, a lever is pivoted to engage and move a plate upward to compress a spring against a weight whereupon the weight is raised to engage and set the dial indicator gage to a zero position. As the weight is raised, a plunger having negligible weight and extending through the weight and plate is unlocked and a contact spring to be tested is horizontally moved under the plunger thereupon slidably moving the plunger a distance within the weight. The mounting of the plunger within the weight permits the plunger to be lifted a lesser or greater distance dependent upon the dimensional differences between successively tested springs. With the spring in position for test, the lever is pivoted in an opposite direction to release the gate whereupon the weight is locked with the plunger which thus moves downwardly to deflect the spring. As the weight drops away from the gage, a deflection reading is recorded.

Other objects and advantages of the present invention will become apparent by reference to the following detailed description and accompanying drawings, wherein.

Figure 1:
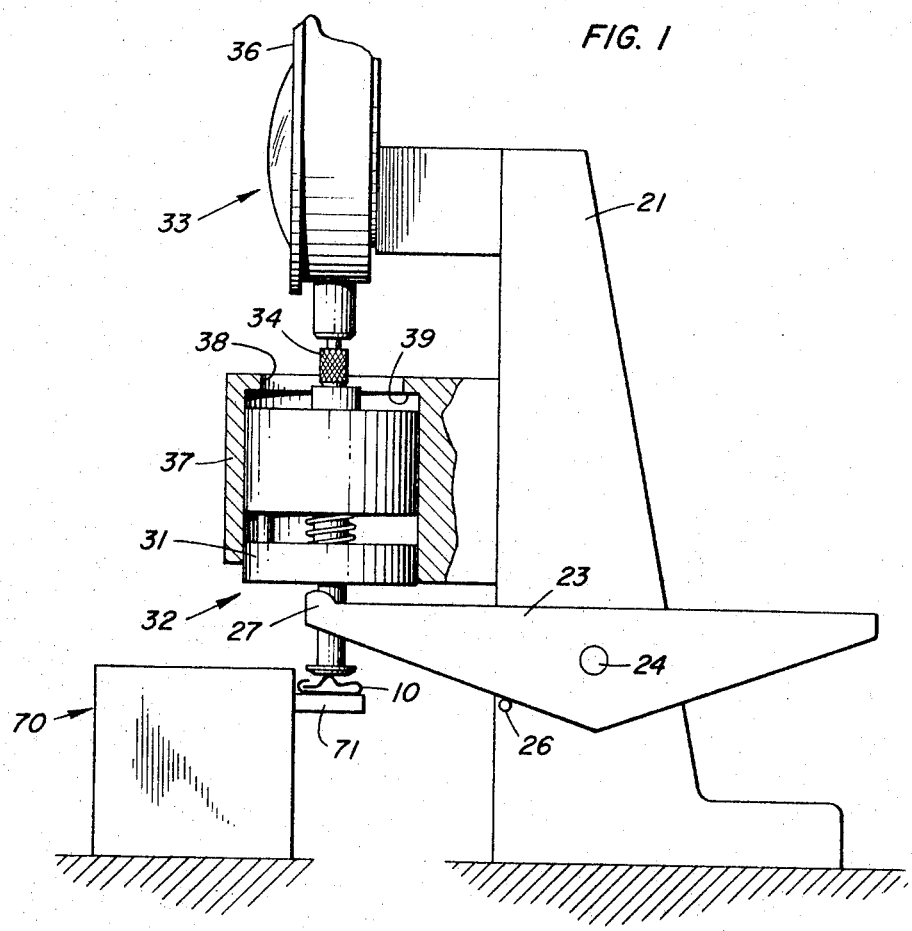
FIG. 1 is a side elevational view partially in section which shows an apparatus embodying the principles of the present invention to automatically reset a gage to an initial start position with facilities for compensating for dimensional variations in a series of the articles to be tested.
Figure 4:
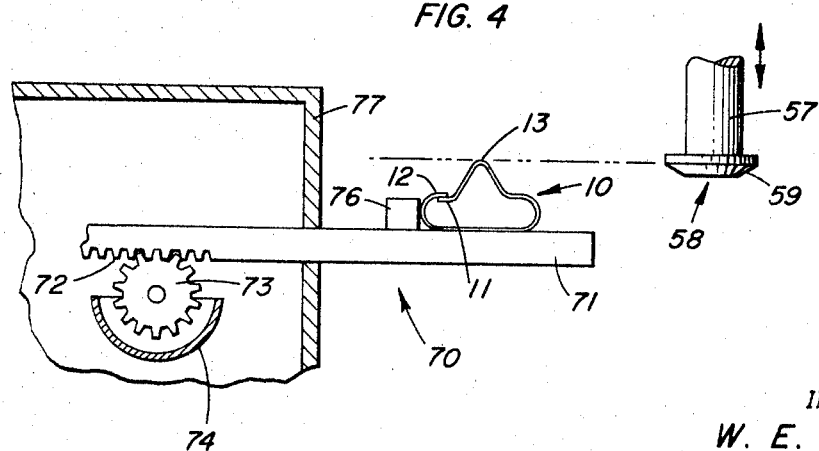
FIG. 4 is an enlarged view of a transfer member for advancing a spring into a test position with the apparatus shown in the other views.

Referring now to FIG. 1, there is shown an apparatus for measuring the deflection of a contact spring 10. The spring 10 is used merely to illustrate the invention and is best shown in FIG. 4. It consists of a strip of metal looped to form contacts 11 and 12 together with a protuberant section 13.

The apparatus is mounted on a standard 21. A lever 23 is pivotally mounted about a fulcrum 24 which laterally extends from the standard 21 and is prevented from pivoting to a vertical position by a stop pin 26. Also, the lever 23 has a forked end 27 to selectively engage a weighted actuator plate 31 which is part of a weighted subassembly 32 whose movement controls the reading of a dual indicator gage 33. The weighted subassembly 32 is accurately dimensioned to control the magnitude of the load to deflect the springs.

The gage 33 may be of any commercially available type having an indicating needle (not shown) actuated by a stem 34 which protrudes from the gage to sense the deflection which is to be measured. A dial 36 having numerical designations imprinted around the periphery thereof is rotatably mounted on the gage 33 so that the dial may be turned to align the zero designation with the needle when the stem 34 is fully depressed. The stem 34 is normally biased out from the gage.

It should be understood that apparatuses other than a dial indicator gage may be used to indicate the deflection. For example, when very sensitive springs are to be tested, it would not be without the scope of this invention to use an optical or electronic device for measuring and recording the deflection of the springs.

The weighted subassembly 32 which is used to deflect a contact spring 10 is slidably positioned within a cylindrical housing 37 that is attached to the standard 21. An opening 38 is formed through the top of the housing to form an annular shoulder 39 which limits the upward movement of the subassembly 32 within the housing 37.

Figure 2:
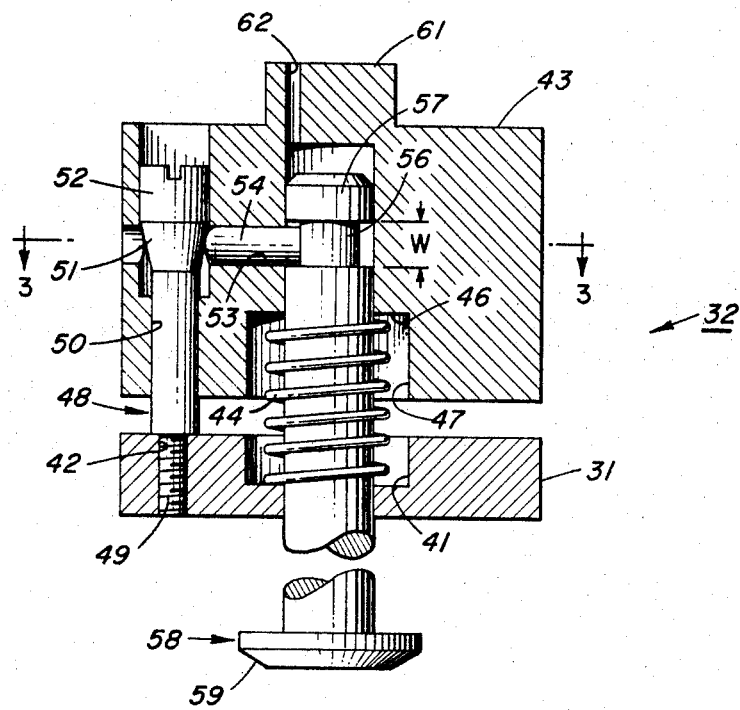
FIG. 2 is a detail view in section of a subassembly comprising a deflecting weight plate, and probe which shows the coupling arrangement of the weight to the plate and the probe.
Figure 3:
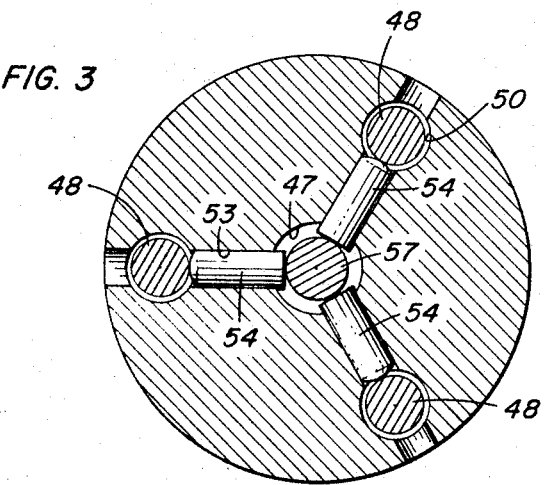
FIG. 3 is a cross sectional view showing an array of coupling pins for selectively locking the probe to the weight to compensate for dimensional variation in successive springs.

In the subassembly 32, the plate 31 has a stepped bore 41 through the center thereof together with three threaded holes 42, only one of which is shown in FIG. 2, equally spaced adjacent to the edge of the plate. A cylindrical weight 43 is spaced above the plate 31 by a compression spring 44 nesting in the large diameter portion of the stepped bore 41 and bearing against an annular ledge 46 of an opposing stepped bore 47 formed in the weight 43. The plate 31 and the weight 43 are coupled together for limited relative movement by three bolts 48 (see FIG. 3), slidably positioned within stepped bores 50 formed about the circumference of the weight. The bolts 48 have threaded ends 49 which are turned into the threaded holes 42 in the plate 31.

Each of the bolts 48 is formed with a tapered section 51 and a headed end 52. Extending from the large diameter portions of the circumferential stepped bores 50 are three horizontal passageways 53. A pin 54 is slidably positioned within each of the horizontal passageways with one end of the pin abutting the tapered section 51 of the bolt 48. The other end of each pin 54 projects into the small diameter portion of the stepped bore 47 and normally contacts a necked-down portion 56 of a sensing plunger 57 extending through bores 47 and 41.

The width $w$ of the necked-down portion 56 of the sensing plunger 57 is greater than the diameter of the pins 54 plus the expected dimensional differences in the height of the various springs. This width $w$ allows the plunger to move and be selectively set relative to the subassembly without disturbing the initial position of the indicator needle in the dial gage 33.

The sensing plunger 57 extends below the bottom of the plate 31 and has a head 58 with beveled edges 59. Furthermore, the plunger extends between the forked ends 27 of the lever 23 to contact a spring 10 to be tested. The sensing plunger 57 is comprised of a low density material. In this way, the plunger has negligible mass which alone is insufficient to deflect the article 10 to open the contacts 11 and 12 when the plunger is initially supported on the spring 10.

The upper end of the weight 43 is formed with a reduced diameter portion 61 through which is drilled a passageway 62. The passageway 62 will vent the stepped bore 47 to escape air that may become entrapped above the sensing plunger 57. To record the movement of the weighted subassembly 32 during the test of a spring 10, the reduced diameter portion 61 is in contact with the stem 34 extending below the dial gage 33.

A transfer member 70 that may be used for moving the articles to be tested into and out of engagement with the sensing plunger is shown in FIG. 4. The transfer member 70 has a reciprocably movable arm 71 having a plurality of serrations 72 formed along a lower edge thereof. The serrations 72 mesh with a gear wheel 73 which may be rotated by a hand wheel 74. A block 76 is attached to the top of the arm 71 to position the spring 10 on the arm and to prevent the spring from being displaced when pushed into engagement with the plunger 57. It should be noted from FIG. 4 that when the spring 10 is positioned on the arm 71, the top of the protuberant 13 is slightly higher than the lower end of the plunger 57.

The dial indicator is initially calibrated or set for zero reading by pivoting the lever 23 off the stop pin 26 in a clockwise direction to engage the forked end 27 against the underside of the plate 31. The plate 31 exerts a force through the spring 44 against the ledge 46 to raise the entire subassembly 32 within the housing 33. As the weight 43 moves upwardly, the reduced diameter portion 61 pushes the stem 34 into the gage 33 until the weight 43 engages the shoulder 39 and comes to rest thereagainst. At this time, the dial 36 may be rotated and set so that the indicator needle reads zero.

In use of the spring tester, the lever 23 is pivoted against the plate 31 to raise the entire sub-assembly 32 whereupon the weight 43 is moved into engagement with the shoulder 39. Further movement of the plate compresses the spring 44 and the plate 31 moves upward relative to the weight 43. The bolts 48 are thus lifted within the stepped bores 50 and the tapered sections 51 are raised thereupon removing the force acting on pins 54. This in turn relieves the coupling force of the pins acting against the necked-down portion 56 of the plunger 57 and allows the plunger to freely move within the bore 47. The plunger 57 thereupon drops within the bore until the upper end rests against the tops of the pins 54 which are still positioned within the necked-down portion 56.

Next, a contact spring 10 is placed on the arm 71 against the block 76 as shown in FIG. 4. The wheel 74 is turned in a clockwise direction to rotate the gear 73 to mesh with the serrations 72 and move the arm 71 to the right until the protuberant section 13 acts against the beveled edges 59 to freely move the plunger through the spring 44 and up into the weight 43. The block 76 holds the spring stationary as the spring is forced under the plunger. At this time, the sensing plunger is supported on the protuberance 13, but because of the negligible mass of the plunger, the spring is not deflected appreciably and the contacts 11 and 12 are not moved.

Now the lever 23 is released and pivots counterclockwise, and the forked end 27 is moved out from under the plate 31. The spring 44 thereupon expands to push the plate 31 down and away from the weight 43. The plate 31 pulls the bolts 48 down within the bores 50 of the weight 43 and the tapered sections 51 ride down along the outer ends of the pins 54 thereby forcing the pins 54 radially in along the passageways 53 into tight contact with the necked-down portion 56 of the plunger 57. The plunger 57, weight 43 and plate 31 are thereupon coupled together and act through the plunger 57 against the spring 10.

The subassembly 32 now drops within the housing 37 to deflect the spring 10, and, as a result, the reduced portion 61 of the weight 43 tends to move away from the stem 34. The stem 34 is biased downwardly and therefore moves a distance equal to the deflection of the spring and the magnitude of the deflection is indicated by the needle riding over the dial on the gage 33.

It should be apparent that dimensional variations in subsequently tested springs will not affect the tests, in that, the internal movement of the plunger 57 with respect to the weight, within the necked-down portion 56, automatically compensates for these variations. Any variations in subsequently tested springs will be compensated by the initial positioning of the plunger 57 on the protuberance 13 and the selective engagement of the pins 54 with the necked-down portion 56 of the sensing plunger 57 upon release of the plate 31. If a subsequent spring has a higher protuberance, the pins 54 will engage the plunger at a lower point within the necked-down portion 56. In a similar manner, if a subsequent spring has a lower protuberance, the pins 54 will engage the plunger at a higher point along the necked-down portion 56.

It is to be understood that the above-identified embodiment is simply illustrative of the principles of the invention and numerous other modifications may be devised without departing from the spirit and scope of the invention.

What is claimed is:
1. In an apparatus for indicating the deflection of springs having a nominal standard dimension;
  means for producing a spring deflecting force;
  a plunger mounted for movement relative to said force producing means to apply the deflecting force to a spring under test; and means rendered effective at a position which compensates for the amount by which the dimension of the spring under test deviates from the nominal standard dimension for selectively coupling the force producing means to the plunger.

2. In a spring deflection measuring device;
a pair of weighted members;
a probe extending through said members;
means for selectively coupling said weighted members together through said probe;
a resilient means interposed between said weighted members for operating said selective coupling means;
means for lifting and lowering said pair of weighted members;
means for limiting said lifting of one of said weighted members while the other weighted member compresses said resilient means to release said selective coupling means;
means for positioning a spring to engage and position said probe; and
means rendered effective upon lowering of said pair of weighted means and expansion of said resilient means for again rendering said coupling means effective to couple said weights together through said probe.

3. In a device as defined in claim 2, where said selective coupling means comprises:
a plurality of radially arrayed pins slidably mounted in a first of said weighted members; and
a plurality of headed bolts threaded into a second of said weighted members and having tapered heads bearing against the ends of said pins for moving said pins in coupling engagement with said probe.

4. In a displacement measurement device;
a weight having a plurality of radially extending bores and an axial bore;
a probe slidably mounted in said axial bore and having a necked-down portion;
a plurality of coupling pins extending through said radially extending bores and into said necked-down portion of said probe;
an actuator plate assembly having a plurality of cam members bearing against said coupling pins;
means for lifting and lowering said actuator plate and weight;
means for limiting said lifting of said weight whereupon said actuator plate moves said cam members relative to said pins to uncouple the pins from said probe; and
a spring interposed between said actuator plate and said weight and rendered effective upon lowering said actautor plate for urging said cam members to act against and force said pins into coupling engagement with said probe within said necked-down portion.

5. In a resilient article deflection tester;
a standard;
a dial indicator gage mounted on said standard and having an actuator stem;
a weight comprising two parts and having a spring interposed therebetween to separate said parts;
releasable means for selectively raising said weight to abut one of said parts against said stem and for compressing said spring;
transfer means for positioning and holding an article to be tested;
a sensing probe freely mounted within said weight and supported on said article; and
means rendered effective upon operation of said releasable means and subsequent expansion of said compressed spring to move said parts relative to each other for coupling said weight to said probe.

6. In a resilient article deflection tester as defined in claim 5 wherein:
said sensing probe has a beveled lower end; and
said transfer means moves an article laterally against the lower end of the probe to cam the article against the beveled edges to raise said probe within said weight to support the probe on the article.

7. In a device for measuring deflection of a contact spring;
a weight;
a linear displacement gage having a stem in contact with said weight;
a sensing plunger slidably mounted in said weight;
means for locking said plunger within said weight;
means for lifting said weight to engage said stem and move said stem into said gage to set said gage to an intial reading;
means responsive to said lifting means for releasing said plunger to freely move relative to said locking means a distance not greater than the dimensional variation between successively tested articles;
transfer means for moving a spring to be tested under said plunger to support said plunger on said spring; and
means effective upon release of said lifting means for actuating said locking means to couple said weight to said plunger to deflect said spring whereupon said weight drops away from said gage to release the stem and indicate the deflection.

References Cited

UNITED STATES PATENTS 2,639,613   5/1953   Richmond _____ 73—161

S. CLEMENT SWISHER, *Acting Primary Examiner.*

WILLIAM HENRY, *Assistant Examiner.*